(No Model.)

W. S. SHARPNECK.
JOURNAL BEARING.

No. 368,246. Patented Aug. 16, 1887.

Witnesses
C. H. Raeder
T. E. Robertson

Inventor
William S. Sharpneck
By his Attorney
T. J. W. Robertson

N. PETERS, Photo-Lithographer, Washington, D. C.

UNITED STATES PATENT OFFICE.

WILLIAM S. SHARPNECK, OF DENVER, COLORADO.

JOURNAL-BEARING.

SPECIFICATION forming part of Letters Patent No. 368,246, dated August 16, 1887.

Application filed December 2, 1886. Serial No. 220,491. (No model.)

*To all whom it may concern:*

Be it known that I, WILLIAM S. SHARPNECK, a citizen of the United States, residing at Denver, in the county of Arapahoe and State of Colorado, have invented certain new and useful Improvements in Journal-Bearings, of which the following is a specification, reference being had therein to the accompanying drawings, in which—

Figure 1:
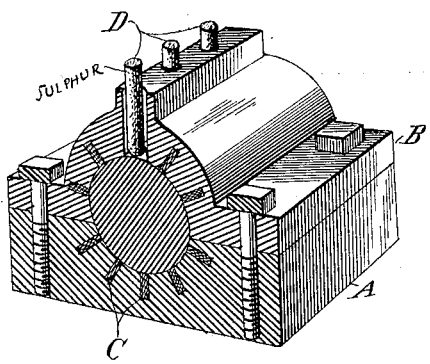
Figure 2:
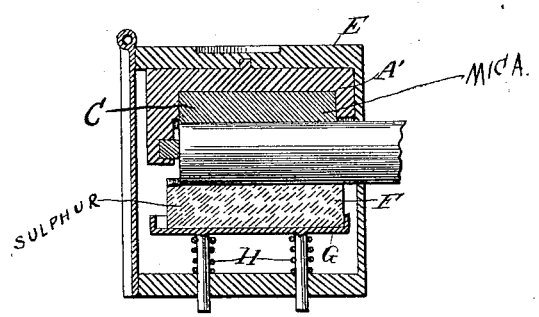

Figure 1 represents a transverse section in perspective of a bearing with the shaft in position; Fig. 2, a transverse section of a journal-box for a railway-truck.

This improvement relates to that class of bearings in which mica is employed as the main wearing-surface; and the invention consists in the peculiar construction, arrangement, and combination of parts hereinafter more particularly described, and then definitely pointed out in the claim.

Referring now to the details of the drawings, A represents the lower part of a journal-bearing, and B the upper part, in both of which are inserted blocks of mica, C. These blocks may be secured in the metal of the bearing in any suitable or desirable manner. They may be set in a suitable mold and the metal of the bearing cast around them; or the bearing may have holes or recesses cast, cut, or otherwise formed in it, and the blocks forced into the holes; or they may be set loosely therein and cemented in any suitable manner that is adapted to hold them securely.

In the upper box I make a series of holes extending entirely through the metal, in each of which I set loosely a stick of sulphur, D, which rests lightly on the shaft or journal. With this arrangement of the bearing a journal may be run for an indefinite time at a high speed and with a heavy load without any lubrication other than what results from the sulphur, and without heating to any objectionable degree. The action of the sulphur on the mica is extraordinary and produces an effect not found with any other lubricant with which I am acquainted. If the journal begins to heat, the end of the sulphur stick resting on the shaft melts, and the melted portion is carried round with the shaft to the blocks of mica and fills any crevices that may be found therein, the surplus sulphur passing into recesses (not shown) between the blocks, where it assists in forming a self-lubricating bearing. Should the shaft again begin to heat a portion of the sulphur that has collected in the recesses is taken up by the journal and carried round as before, and thus the journal is always kept cool, or comparatively so, without oil or any other lubricant than the sulphur, which, when once supplied, lasts a long time, as it is but seldom that the journal becomes hot enough to melt the sulphur, and when it does the effect of the sulphur on the mica is such that it cools almost immediately.

I may sometimes set the mica in solid blocks, filling the entire box, as shown in Fig. 3; but in all cases I prefer to have the grain of the mica run in line with the shaft or journal, for the reason that there frequently occur thin streaks or veins in the mica that are harder than the mass, which hard streaks, if the grain of the mica is set transversely of the shaft, will cut or wear ridges in the same. This will not occur if the mica is set lengthwise, as all parts of the journal or shaft will have an equal bearing on the mica, and thus the wear will be alike on all parts of the shaft.

If the bearing is to be used in a journal-box for railroad-cars, I prefer the arrangement shown in Fig. 2, in which E represents the box, A' the bearing, and F a piece of sulphur set on a plate, G, and held to the bottom of the journal by springs H. In this case I may make holes or recesses (not shown) in the bearing in the same way and for the same purpose as the recesses in the bearing A.

For many purposes the arrangement of the mica in a series of small blocks is better than where it is set in one large block, as the metal more securely holds the mica in place and prevents its being crushed by any extra jars or strains to which the bearing may be subjected.

What I claim as new is—

A journal-bearing having a wearing-surface of mica, in combination with solid blocks of sulphur held in contact with the journal, substantially as described.

In testimony whereof I affix my signature, in presence of two witnesses, this 1st day of December, 1886.

WILLIAM S. SHARPNECK.

Witnesses:
S. A. TERRY,
T. J. W. ROBERTSON.